US010215877B2

(12) United States Patent
Sorensen

(10) Patent No.: US 10,215,877 B2
(45) Date of Patent: Feb. 26, 2019

(54) AIRBORNE ELECTROMAGNETIC SURVEY SYSTEM WITH MULTIPLE TRANSMITTER ARRANGEMENTS

(71) Applicant: Selskabet of 6. April 2010 ApS, Aarhus (DK)

(72) Inventor: Kurt I. Sorensen, Horning (DK)

(73) Assignee: SELSKABET AF 6. APRIL 2010 APS, Aarhus N (DK)

( * ) Notice: Subject to any disclaimer, the term of this patent is extended or adjusted under 35 U.S.C. 154(b) by 188 days.

(21) Appl. No.: 15/126,869

(22) PCT Filed: Mar. 16, 2015

(86) PCT No.: PCT/DK2015/050051
§ 371 (c)(1),
(2) Date: Sep. 16, 2016

(87) PCT Pub. No.: WO2015/139706
PCT Pub. Date: Sep. 24, 2015

(65) Prior Publication Data
US 2017/0115425 A1 Apr. 27, 2017

(30) Foreign Application Priority Data
Mar. 17, 2014 (DK) .......................... PA 2014 70130

(51) Int. Cl.
*G01V 3/02* (2006.01)
*G01V 3/165* (2006.01)
*G01V 3/36* (2006.01)

(52) U.S. Cl.
CPC ................ *G01V 3/165* (2013.01); *G01V 3/36* (2013.01)

(58) Field of Classification Search
CPC ................................. G01V 3/165; G01V 3/36
(Continued)

(56) References Cited

U.S. PATENT DOCUMENTS 4,535,292 A  8/1985  Ensing
4,544,892 A  10/1985 Kaufman et al.
(Continued)

FOREIGN PATENT DOCUMENTS

WO    WO 96/33426 A1    10/1996
WO    WO 2011/050139 A2  4/2011
(Continued)

OTHER PUBLICATIONS

International Search Report and Written Opinion dated Jul. 21, 2015 for corresponding PCT Patent Application No. PCT/DK2015/050051, 10 pages.
(Continued)

*Primary Examiner* — Farhana Hoque
(74) *Attorney, Agent, or Firm* — Vista IP Law Group, LLP

(57) ABSTRACT

An airborne electromagnetic survey system includes: a transmitter arrangement comprising at least one current source configured to connect with a transmitter coil arrangement, and a switch arrangement between the at least one current source and the transmitter coil arrangement, the switch arrangement configured to (1) connect the at least one current source with the transmitter coil arrangement to build up a connecting secondary electromagnetic field, and (2) disconnect the at least one current source from the transmitter coil arrangement to build up a disconnecting secondary electromagnetic field; and a receiver arrangement comprising at least one receiver coil; wherein the airborne electromagnetic survey system further comprises an additional transmitter coil arrangement and a switch arrangement controller, the switch arrangement controller configured to disconnect the at least one current source from the transmitter coil arrangement and the additional transmitter coil arrangement at substantially a same time.

16 Claims, 9 Drawing Sheets

(58) Field of Classification Search
USPC .................................................. 324/331, 336
See application file for complete search history.

(56) References Cited

U.S. PATENT DOCUMENTS

| | | | |
|---|---|---|---|
| 5,796,253 A * | 8/1998 | Bosnar .................... | G01V 3/165 |
| | | | 324/239 |
| 2005/0001622 A1 | 1/2005 | Morrison et al. | |
| 2006/0015255 A1 | 1/2006 | Sorensen | |
| 2008/0007265 A1* | 1/2008 | Milne ..................... | G01V 3/083 |
| | | | 324/347 |
| 2013/0093426 A1* | 4/2013 | Peppe ...................... | G01V 3/00 |
| | | | 324/365 |
| 2013/0173163 A1 | 7/2013 | Zhandov et al. | |

FOREIGN PATENT DOCUMENTS

WO    WO 2012/175088 A1    12/2012
WO    WO 2015/139706 A1    9/2015

OTHER PUBLICATIONS

Danish Search Report dated Oct. 16, 2014 for corresponding Danish Patent Application No. PA 2014 70130, 4 pages.

* cited by examiner

AIRBORNE ELECTROMAGNETIC SURVEY SYSTEM WITH MULTIPLE TRANSMITTER ARRANGEMENTS

RELATED APPLICATION DATA

This is the national phase of International Patent Application No. PCT/DK2015/050051, filed Mar. 16, 2015, pending, which claims priority to Danish Patent Application No. PA 2014 70130, filed Mar. 17, 2014. The entire disclosures of both of the above applications are expressly incorporated by reference herein.

FIELD

An objective is achieved by an airborne electromagnetic survey system configured for geophysical prospecting of an underground formation, which airborne electromagnetic survey system comprises a transmitter arrangement $T_x$ comprising at least one current source connected to at least one transmitter coil arrangement covering an area A for generating a magnetic moment for building up a primary electromagnetic field inducing a secondary electromagnetic field in the underground formation and a switch arrangement comprising at least one switch inserted in between the at least one current source and the at least one transmitter coil arrangement.

The switch arrangement is configured to connect the at least one current source with the at least one transmitter coil arrangement to build up a connecting secondary electromagnetic field in a underground formation, which connect is at a connection time at a connection voltage at a connection current. The switch arrangement is furthermore arranged to disconnect the at least one current source from the at least one transmitter coil arrangement to build up a disconnecting secondary electromagnetic field in a underground formation; which disconnect is at a disconnection time at a disconnection voltage at a disconnection current. The connecting secondary electromagnetic field and disconnecting secondary electromagnetic fields form a combined secondary electromagnetic field.

BACKGROUND

Geophysical prospecting by application of electromagnetic surveys where a primary electromagnetic field is generated to induce a secondary electromagnetic field in an underground formation has become widespread. During the last decades, survey systems for performing such prospecting have become airborne. An airborne electromagnetic system may comprise a tow assembly connected to an aircraft, typically a helicopter, and further comprising a transmitter system for generating the primary electromagnetic field that induces the secondary electromagnetic field in the underground formation. The secondary electromagnetic field is detected by a receiver system.

Achieving a high magnetic moment has been a goal achieved by increasing the current or the area of the transmitter. Such straight forward improvements have previously resulted in larger frames or larger current sources, which have proven difficult to implement or operate in airborne systems.

Larger frames with larger transmitter coils and thus a larger area have proven much more difficult to handle operationally than foreseen.

Simply increasing the current has also proven difficult due to appearance of higher order electromagnetic effects becoming significant and thus imposing limitation on how early measurements can be made in transient electromagnetic (TEM) systems. This implies longer wait times, basically a "dead-time" before the current has decayed in a transmitter coil. One way to reduce the wait time is to use a conductor or wire where each core is isolated, such as a Litz Wire. It is an objective to able to measure at event earlier times or to provide an alternative way than using special conductors.

Likewise, increasing the number of turns in a transmitter coil has proven difficult due to higher voltages when switching on and off the current source from the transmitter coil. Higher voltages may cause devastating and dangerous voltage breakthroughs or simply reduce quality of the measurements.

U.S. Pat. No. 5,796,253 relates to time domain electromagnetic mapping technique for geophysical prospecting and discloses techniques where a sequence or succession of multiple half sinusoids transmitter pulses replaces a single half sinusoid waveform to achieve steeper decays of the or fall time of the current in the transmitter coil. The letter discloses circuits for generating sequences or pulse trains of such half sinusoids in uncoupled transmitter coils.

It is an objective of this disclosure to improve upon such limitations.

SUMMARY

An objective is achieved by an airborne electromagnetic survey system configured for geophysical prospecting of an underground formation, which airborne electromagnetic survey system comprises a transmitter arrangement $T_x$ comprising at least one current source connected to at least one transmitter coil arrangement covering an area A for generating a magnetic moment for building up a primary electromagnetic field inducing a secondary electromagnetic field in the underground formation and a switch arrangement comprising at least one switch inserted in between the at least one current source and the at least one transmitter coil arrangement.

The switch arrangement is configured to connect the at least one current source with the at least one transmitter coil arrangement to build up a connecting secondary electromagnetic field, which connect is at a connection time at a connection voltage at a connection current. The switch arrangement is furthermore arranged to disconnect the at least one current source from the at least one transmitter coil arrangement to build up a disconnecting secondary electromagnetic field; which disconnect is at a disconnection time at a disconnection voltage at a disconnection current. The connecting secondary electromagnetic field and disconnecting secondary electromagnetic field provide or form a combined secondary electromagnetic field.

The airborne geophysical prospecting system further comprises a receiver arrangement $R_x$ comprising at least one receiver coil configured to receive the combined connecting and disconnecting secondary electromagnetic fields. The airborne electromagnetic survey system comprises multiple transmitter arrangements $T_x$ generating a total secondary electromagnetic field comprising a sum of individual combined secondary electromagnetic fields.

Thereby is achieved a significant increase in the magnetic moment by applying several transmitter arrangements Tx.

"Connect" or "disconnect" may be understood an event or an action.

Alternatively, a much smaller frame can be used and thus allow for operation either at places or during circumstances otherwise excluded or cumbersome. Furthermore, using smaller systems or frames will result in faster survey times and/or at reduced operational costs.

One effect is that the turn off or disconnect voltage in this manner can be reduced for the individual transmitter coil arrangement, whilst maintaining the turn off time, and thereby reduce the risk for current penetration and hazard for operation personal.

Another effect or advantage is that smaller coils or thinner wires can be used to achieve the same magnetic moments without the disadvantages of otherwise larger coils or thicker wires required to carry required currents and/or to mitigate undesirable electromagnetic effects such as coupling, self-inductance and/or eddy currents.

A transmitter arrangement may have separate transmitter coils. The transmitter coils may be in series, in parallel or in groups in parallel being in series and/or in groups in series being in parallel.

In an embodiment, the airborne electromagnetic survey system may further comprise a switch arrangement controller configured to control each switch arrangement of the system.

Thus, the electromagnetic system will be able to control each switch arrangement according to operational circumstances and provide a means to perform switching as precisely as required.

The switch arrangement controller may be programmable or hard wired with adjustable timing means for providing timely control signals. In an embodiment the switch arrangement controller may be connected to each switch arrangement by cables adjusted in length or otherwise to compensate for time of flight of signals from the location of the controller to each switch arrangement.

In an embodiment of the airborne electromagnetic survey system, the switch arrangement controller and each switch arrangement is configured to control each switch arrangement to disconnect each current source from each transmitter coil arrangement at substantially the same time.

By disconnecting at the same time is understood that each switch is configured to be switched to disconnect the current source from the transmitter coil generating the secondary field contribution so that the characteristics of the secondary field is desired.

Ideally the switch arrangements should disconnect at the same time or simultaneously.

The secondary field contributions should in practice be synchronised to within 50 µs, to within 10 µs; or more preferably to within 1 µs.

In an embodiment where transmitter coils and transmitter arguments are identical, the controller may be arranged to provide switching signals, and switching arrangements may be configured to switch individual switches to within 50 µs, preferably within 10 µs or more preferably to within 1 µs.

A starting point may be to use identical components extending to the length of cables. Alternatively, each transmitter arrangement may be adjusted so as to synchronize. Such synchronisation may require introduction of delays in components, in between components or adjustment of the signals from the controller.

A person skilled in the art will acknowledge the need for some systematic calibration and synchronising work.

A further advantage of disconnecting to the same time or simultaneously is that the electromagnetic field generated or induced when the system is synchronised will be as pure or identical as possible and thus result in less need for post-processing of measured data.

In an embodiment of the airborne electromagnetic survey system, the switch arrangement controller is configured to record each disconnection time of each disconnect by each switch arrangement.

To further improve or advance the survey system or to compensate for time lags or time differences, recording of the time of disconnection time of each disconnect has been observed to be valuable. The time of disconnect may be provided by measuring currents or voltages or fields occurring from the transmitter coils. Alternatively, recordings of controller signals may provide measurements of disconnection time. In either case, the times of each disconnection time may be recorded and stored along with recordings from the receiver arrangement.

This will allow for measured data to be post processed and taking effects of time differences into account in a corrective fashion.

In an embodiment of the airborne electromagnetic survey system, the switch arrangement controller and each switch arrangement is configured to control each switch arrangement to connect each current source to each transmitter coil arrangement at substantially the same time.

Configuration of the controller is essentially the same as for the disconnection outlined. However, the person skilled in the art will appreciate differences in current management when disconnecting and when connecting. Attempts to apply simple configurations that are identical or symmetrical for providing current and leading currents away may result in undesirable results such as remaining electromagnetic fields.

In an embodiment the controller is configured to ramp up the current in a transmitter coil arrangement directly by connecting a voltage source through a connecting switch and to let the current ramp up—essentially exponentially—to the more or less maximal value in steady state given Ohm's law as the voltage across a transmitter coil over the resistance in the transmitter coil.

In another embodiment the current in a transmitter coil is cut-off and used to charge a capacitor as long as charge from the transmitter coil is available. The remaining current is drained by a resistor. The stored charge in the capacitor is then used to ramp up the current in a transmitter coil again and the high voltage results in a very fast ramp-up of the current. When the voltage across the capacitor has been lowered to a given value, the connection between the transmitter coil and the capacitor is switched off and a connection between the transmitter coil and a generator is switched on, possibly through a capacitor. The generator then maintains the current until the next switch-off or cycle.

This switching method has the advantage that is ramps-up the current in the transmitter coil very fast. Likewise this switching method can ramp-down the current equally fast.

In an embodiment of the airborne electromagnetic survey system, the switch arrangement controller may be configured to record each connection time of each connect by each switch arrangement.

Likewise, recording of the connections may be advantageous. A person skilled in the art implements the same type of logic in recording the disconnect and connect based on the logic of a controller. Making recording of changes in the currents or voltages or fields in the transmitter arrangements may require different implementations of the sensing of disconnect and connect due to differences in the voltages or currents during switching off and during switching on.

Besides the logic of the controller, the switch arrangements including actual switches may be properly configured. A switch arrangement may be configured to handle disconnect voltages of between 0-6 kV. In particular, a switch arrangement may be configured to handle voltage breakthroughs from 500 V, 1800 V upward to about 5 kV.

Also, the switch arrangements may be configured to operate with disconnect currents below about 100 mA. Ideally, the arrangement may be configured to disconnect with zero amperage.

Likewise, the switch arrangements may be configured to connect at voltages of between 1 V to 5 kV. Also the switch arrangements may be configured to connect currents in the order of 5 A, or even in the range of 50 A to 500 A.

The lower voltage in the order of 1 V may be applicable when the current ramp-up is direct and the larger voltage is when the generator may take over or when switched from a capacitor to a generator.

Ideally, the system may be able to connect at as high amperage as possible and disconnect to zero amperage without any effect of the voltage. However, the above mentioned ranges have been observed to be adequate in practice and be configurable by using available components at tolerable sizes and weights of equipment. This to a degree where configuring a system using multiple transmitter arrangements become advantageous or necessary to overcome deficiencies of the prior art.

In an embodiment of the airborne electromagnetic survey system, there is only a single current source.

This embodiment may be advantageous since it allows for relatively simple configuration where power handling is required only at one place or in one system.

In an embodiment a power generator feeds one or more current sources. The power generator may feed the current sources in parallel, in series or sequentially.

In an embodiment of the airborne electromagnetic survey system, a current source comprises a capacitor, a super capacitor, or a battery; or a bank of such.

Capacitors are advantageous since they can be easily recharged and configured to deliver a certain quantified amount of power.

Super capacitors or ultra capacitors are further advantageous due to the higher energy storage as compared to capacitors.

In an embodiment of the airborne electromagnetic survey system, the current source comprises a generator being a motor generator or a fuel cell.

In an embodiment mechanical energy storage may be used in between a transmitter arrangement and a generator. In an embodiment the mechanical energy storage is a flywheel configuration. An advantage of a flywheel is that the weight may be reduced compared to a capacitor/super capacitor embodiment. A further advantage may be that otherwise complicated electronics may be eliminated.

The generator may be configured to charge or recharge capacitors or batteries or combinations thereof. A person skilled in the art will appreciate the design options provided by a Ragone representation to configure that current source according to operational requirements in terms of power requirements, i.e. energy density and power density. Whilst conventional capacitors may have a high power density (W/kg) and fast charge and de-charge times (in the order of μ-seconds), conventional capacitors may have a low energy density. Ultra capacitors will have slower charge and de-charge times (eg. seconds), but higher energy densities. Batteries in the other end will have charge time of hours much higher energy densities. Finally, fuel cells (including fuel) will have even higher energy densities, but lower power densities, as will motor generators.

In an embodiment of the airborne electromagnetic survey system, a switch arrangement comprises at least two switches.

In an embodiment, each switch may be connected to a transmitter arrangement and the control of switches may be as follows. First a connection from a first transmitter coil to a current source is established and the current is cut off. Second a connection from a second transmitter coil to a current source is established and the current is cut off. Thus one is active and another is inactive. This is repeated. In this embodiment the transmitter coils may be placed on top of each other to couple the two coils. The direction of currents may be opposite in the two coils and thus the primary magnetic field can be reversed. Such configuration may require less electronics and less power losses. Compared to the double switch arrangement, two transmitter coils are required and thus the system weighs more.

In another embodiment four switches in a bridge configuration may be used. Compared to the double switch arrangement, only transmitter coils is required and thus the system weighs less.

Thereby is provided a switch for connection and a switch for disconnection.

In an embodiment of the airborne electromagnetic survey system, a switch arrangement is arranged with switches in a bridge configuration.

Thereby is provided a switch arrangement type that allows for connection as well as disconnection and in particular handling currents to achieve even sharper or more precise transitions.

In an embodiment of the airborne electromagnetic survey system, a switch is a semiconductor type switch. Although the working of the disclosed switch arrangement may use other types of switches such as contacts or configurations of contacts, a semiconductor type switch has showed to provide adequate switching times and characteristics as well as being easily controllable.

In an embodiment of the airborne electromagnetic survey system, the transmitter coil arrangements are placed on top of each other thus providing an essentially 100% coupling between the transmitter coils.

In an embodiment of the airborne electromagnetic survey system, each combined secondary electromagnetic fields are essentially identical.

The placement of a receiver arrangement in relation to transmitter arrangements may be performed according to design. The receiver arrangement may be located in the centre of the transmitter arrangement. The receiver arrangement may be in the same plane or shifted to another plane. Alternatively, the receiver arrangement may be placed in a location where the magnetic field strength from the transmitter coil is minimal if not eliminated.

In an aspect, an objective is achieved by a method of geophysical prospecting comprising use of an airborne electromagnetic survey system configured for geophysical prospecting of an underground formation. The method of geophysical prospecting comprises generating a total secondary electromagnetic field comprising a sum of individually combined (connecting and disconnecting) secondary electromagnetic fields using multiple transmitter arrangements $T_x$. A transmitter arrangement may comprise at least one current source connected to at least one transmitter coil arrangement covering an area A for generating a magnetic moment for building up a primary electromagnetic field inducing a secondary electromagnetic field in the underground formation. This may be achieved by switching a switch arrangement comprising at least one switch inserted in between the at least one current source and the at least one transmitter coil arrangement and configured to connect the at last one current source with the at least one transmitter coil arrangement to build up a connecting secondary electromagnetic field, which connect is at a connection time at a connection voltage at a connection current. The switching arrangement may furthermore be configured to disconnect the at least one current source from the at least one transmitter coil arrangement to build up a disconnecting secondary electromagnetic field; which disconnect is at a disconnection time at a disconnection voltage at a disconnection current.

The method of geophysical prospecting may also comprise receiving a combined, connecting and disconnecting, secondary electromagnetic field using a receiver arrangement $R_x$ comprising at least one receiver coil configured to receive the combined, connecting and disconnecting, secondary electromagnetic fields.

In a further embodiment a method of geophysical prospecting encompasses switching of each switch arrangement that comprises disconnecting the at least one current source from the at least one transmitter coil arrangement to build up a disconnecting secondary electromagnetic field; which disconnecting is at a disconnection time at a disconnection voltage at a disconnection current; which disconnecting of each current source from each transmitter coil arrangement is at substantially the same time.

In a further embodiment a method of geophysical prospecting encompasses switching of each switch arrangement that comprises connecting the at least one current source to the at least one transmitter coil arrangement to build up a connecting secondary electromagnetic field; which connecting is at a connection time at a connection voltage at a connection current; which connecting of each current source to each transmitter coil arrangement is at substantially the same time.

The methods solve the same problems as described for the systems. Furthermore, a person skilled in the art will appreciate that further steps or processes in the method can be accomplished by making use of system features as disclosed, or equivalents. As such, a person skilled in the art will appreciate transforming a system feature to a method step having the same functionality. As such carrying out steps may not be limited to making use of the herein disclosed system components, but also be achieved by performing steps having the same or equivalent functionality.

An airborne electromagnetic survey system configured for geophysical prospecting of an underground formation, the airborne electromagnetic survey system includes: a transmitter arrangement comprising at least one current source configured to connect with a transmitter coil arrangement covering an area for generating a magnetic moment for building up a primary electromagnetic field, and a switch arrangement comprising at least one switch between the at least one current source and the transmitter coil arrangement, the switch arrangement configured to (1) connect the at least one current source with the transmitter coil arrangement at a connection time at a connection voltage at a connection current, to build up a connecting secondary electromagnetic field, and (2) disconnect the at least one current source from the transmitter coil arrangement at a disconnection time at a disconnection voltage at a disconnection current, to build up a disconnecting secondary electromagnetic field, wherein the connecting secondary electromagnetic field and the disconnecting secondary electromagnetic field provide a combined secondary electromagnetic field; and a receiver arrangement comprising at least one receiver coil configured to receive the combined secondary electromagnetic field; wherein the airborne electromagnetic survey system further comprises an additional transmitter coil arrangement and a switch arrangement controller, the switch arrangement controller configured to disconnect the at least one current source from the transmitter coil arrangement and the additional transmitter coil arrangement at substantially a same time for generating individual secondary electromagnetic fields whose sum contributes to a total secondary electromagnetic field.

Optionally, the transmitter coil arrangement and the additional transmitter coil arrangement are coupled to each other by being on top of each other.

Optionally, the switch arrangement controller is configured to record the disconnection times associated with the respective transmitter coil arrangements.

Optionally, the switch arrangement controller is also configured to connect the at least one current source to the transmitter coil arrangement and the additional transmitter coil arrangement at substantially a same time.

Optionally, the individual combined secondary electromagnetic fields are identical to each another.

Optionally, the switch arrangement controller is configured to record the connection times associated with the respective transmitter coil arrangements.

Optionally, the at least one current source comprises only a single current source.

Optionally, the current source comprises a capacitor, a super capacitor, a mechanical storage, a flywheel, a battery, or any combination of the foregoing.

Optionally, the current source comprises a motor generator or a fuel cell.

Optionally, the switch arrangement comprises least two switches.

Optionally, the switch arrangement comprises switches in a bridge configuration.

Optionally, the switch is a semiconductor type switch.

A method of geophysical prospecting comprising use of an airborne electromagnetic survey system configured for geophysical prospecting of an underground formation, the method includes: generating a total secondary electromagnetic field comprising a sum of individual combined secondary electromagnetic fields, wherein the act of generating the total secondary electromagnetic field comprises: switching, via a switch arrangement comprising at least one switch between at least one current source and a transmitter coil arrangement, to (1) connect the at least one current source with the transmitter coil arrangement at a connection time at a connection voltage at a connection current, to build up a connecting secondary electromagnetic field, and (2) disconnect the at least one current source from the transmitter coil arrangement at a disconnection time at a disconnection voltage at a disconnection current, to build up a disconnecting secondary electromagnetic field; and receiving the connecting and disconnecting secondary electromagnetic field using a receiver arrangement comprising at least one receiver coil; wherein the act of switching further comprises disconnecting the at least one current source from an additional transmitter coil arrangement, and wherein the transmitter coil arrangement and the additional transmitter coil arrangement are disconnected from the at least one current source at substantially a same time.

Optionally, the act of switching further comprises connecting the at least one current source to the additional transmitter coil arrangement, wherein the transmitter coil arrangement and the additional transmitter coil arrangement are connected to the at least one current source at substantially a same time.

Optionally, the transmitter coil arrangements are coupled to each other by being on top of each other.

Other and further aspects and features will be evident from reading the following detailed description of the embodiments

BRIEF DESCRIPTION OF DRAWINGS

Embodiments will be described in the figures, whereon.

DETAILED DESCRIPTION

Figure 1:
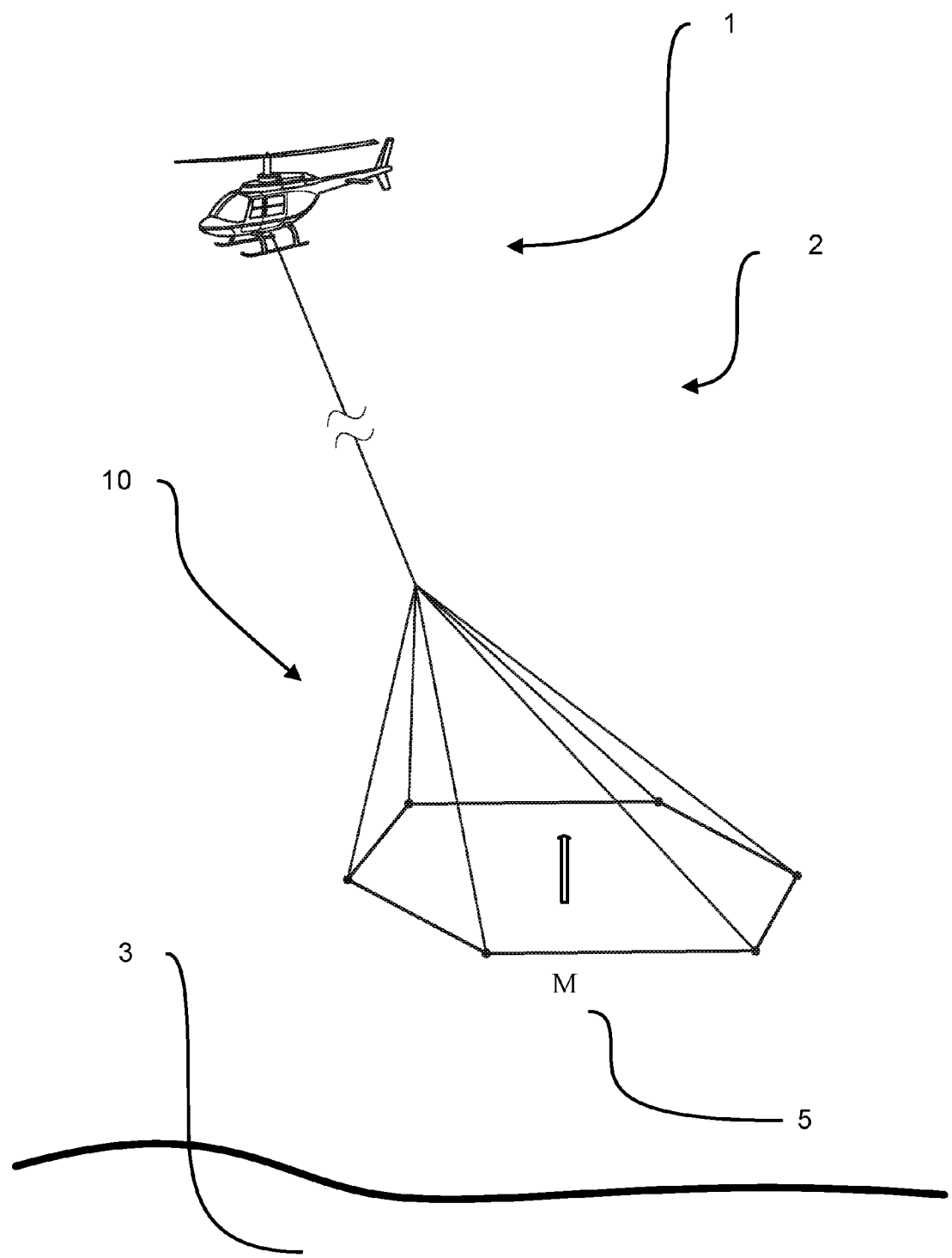
FIG. 1 illustrates an airborne electromagnetic system for geophysical prospecting of an underground.

| Item | No |
|---|---|
| Airborne electromagnetic survey system | 1 |
| Geophysical prospecting | 2 |
| Underground formation | 3 |
| Magnetic moment | 5 |
| Transmitter arrangement, Tx | 10 |
| Primary electromagnetic field | 11 |
| Secondary electromagnetic field | 12 |
| Current Source | 15 |
| Switch arrangement | 20 |
| Switch | 22 |
| Transmitter coil arrangement | 24 |
| Connect | 30 |
| Connection time | 32 |
| Connection voltage | 34 |
| Connection current | 36 |
| Connecting secondary electromagnetic field | 38 |
| Disconnect | 40 |
| Disconnection time | 42 |
| Disconnection voltage | 44 |
| Disconnection current | 46 |
| Disconnecting secondary electromagnetic field | 48 |
| Combined (connecting and disconnecting) secondary electromagnetic field | 50 |
| Total secondary electromagnetic field | 55 |
| Receiver arrangement | 60 |
| Receiver coil | 62 |
| Switch arrangement controller | 70 |
| Switch control | 72 |

-continued

| Item | No |
|---|---|
| Same time | 75 |
| Generator | 80 |
| Bridge Configuration | 90 |
| Method of geophysical prospecting | 100 |
| Generating | 200 |
| Switching | 300 |
| Connecting | 320 |
| Disconnecting | 340 |
| Receiving | 400 |

Various embodiments are described hereinafter with reference to the figures. It should be noted that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates an airborne electromagnetic system 1 for geophysical prospecting 2 of an underground 3. The system is configured to provide a magnetic moment 5 by means of a transmitter arrangement 10.

Figure 2:
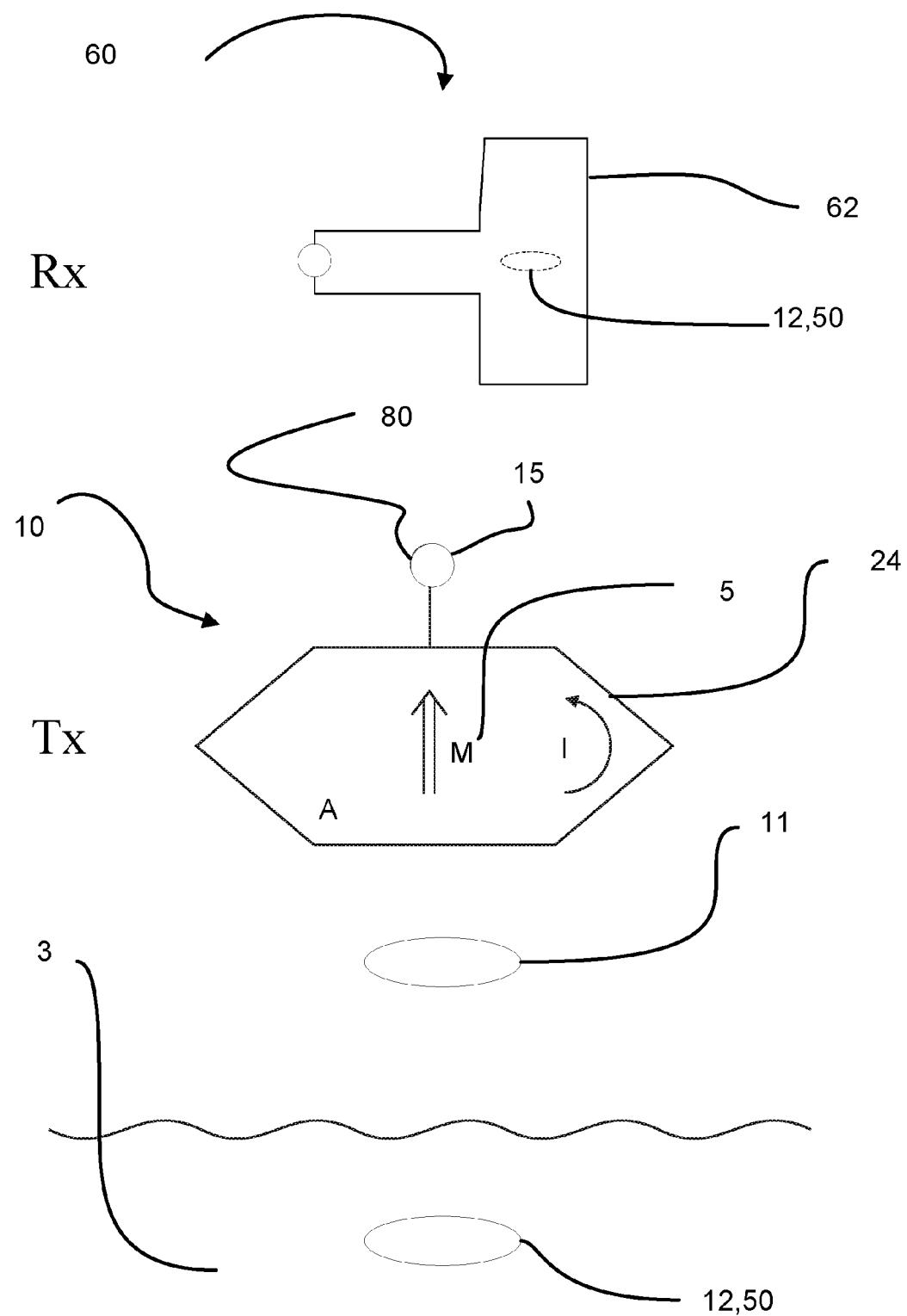
FIG. 2 illustrates a transmitter arrangement for inducing a secondary electromagnetic field in the underground and a receiver arrangement for receiving a combined secondary electromagnetic field.

FIG. 2 illustrates a transmitter arrangement 10 for inducing a secondary electromagnetic field 12 in the underground 3 and a receiver arrangement 60 for receiving a combined secondary electromagnetic field 50.

The airborne electromagnetic survey system comprises a transmitter arrangement $T_x$ 10 comprising at least one current source 15 possibly fed by a generator 80 and connected to at least one transmitter coil arrangement 24 covering an area A for generating a magnetic moment 5 for building up a primary electromagnetic field 11 inducing a secondary electromagnetic field 12 in the underground formation and a switch arrangement 20 (not shown).

The airborne geophysical prospecting system further comprises a receiver arrangement 60 $R_x$ comprising at least one receiver coil 62 configured to receive the secondary electromagnetic field 12 or the combined connecting and disconnecting secondary electromagnetic fields 50, where the connection and disconnection will be exemplified in the following.

Figure 3:
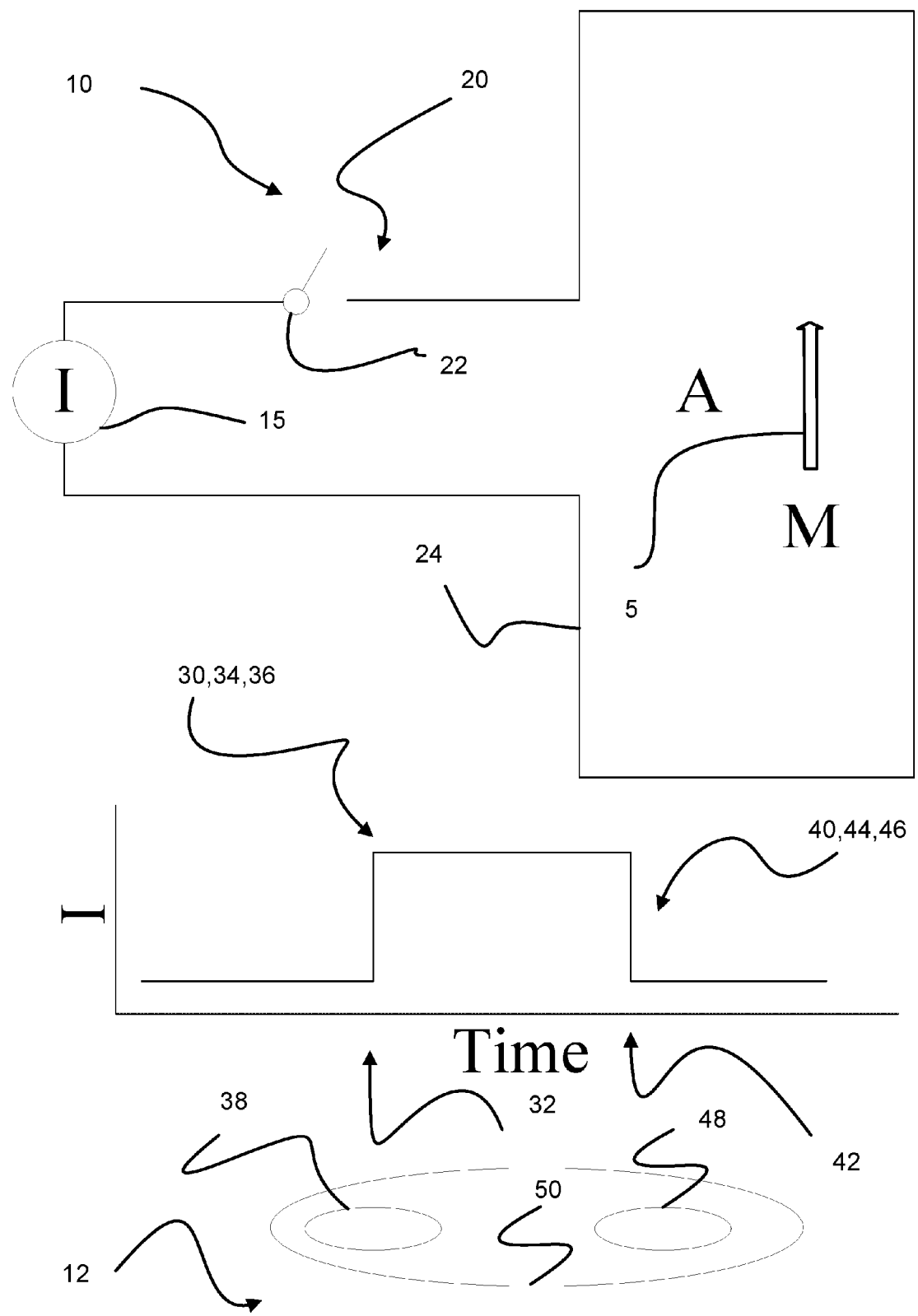
FIG. 3 illustrates a transmitter arrangement and a switch arrangement for connecting and disconnecting a transmitter coil to a current source building up a connecting secondary electromagnetic field and a disconnecting secondary electromagnetic field.

FIG. 3 illustrates a transmitter arrangement 10 with a switch arrangement 20 for connecting and disconnecting a transmitter coil arrangement 24 to a current source 15 building up a connecting secondary electromagnetic field 38 and a disconnecting secondary electromagnetic field 48; both as induced secondary electromagnetic fields 12.

The airborne electromagnetic survey system comprises a transmitter arrangement 10 $T_x$ comprising at least one current source 15 connected to at least one transmitter coil arrangement 24 covering an area A for generating a magnetic moment 5 for building up a primary electromagnetic field inducing a secondary electromagnetic field 12 in the underground formation. The switch arrangement 20 comprises at least one switch 22 inserted in between the at least one current source 15 and the at least one transmitter coil arrangement 24.

The switch arrangement 20 is configured to connect 30 the at least one current source 15 with the at least one transmitter coil arrangement 24 to build up a connecting secondary electromagnetic field 38, which connect 30 is at a connection time 32 at a connection voltage 34 at a connection current 36, which voltage and currents are illustrated by the pulse with a square pulse with an onset and an offset. The switch arrangement 20 is furthermore arranged to disconnect 40 the at least one current source 15 from the at least one transmitter coil arrangement 24 to build up a disconnecting secondary electromagnetic field 48; which disconnect 40 is at a disconnection time 42 at a disconnection voltage 44 at a disconnection current 46. The connecting secondary electromagnetic field 38 and disconnecting secondary electromagnetic field 48 form a combined secondary electromagnetic field 50.

The airborne geophysical prospecting system further comprises a receiver arrangement $R_x$ comprising at least one receiver coil configured to receive the combined 50 connecting 38 and disconnecting 48 secondary electromagnetic fields 12.

Features described on FIG. 3 will be applicable to the following figures, without explicitly being shown in each figure.

Figure 4:
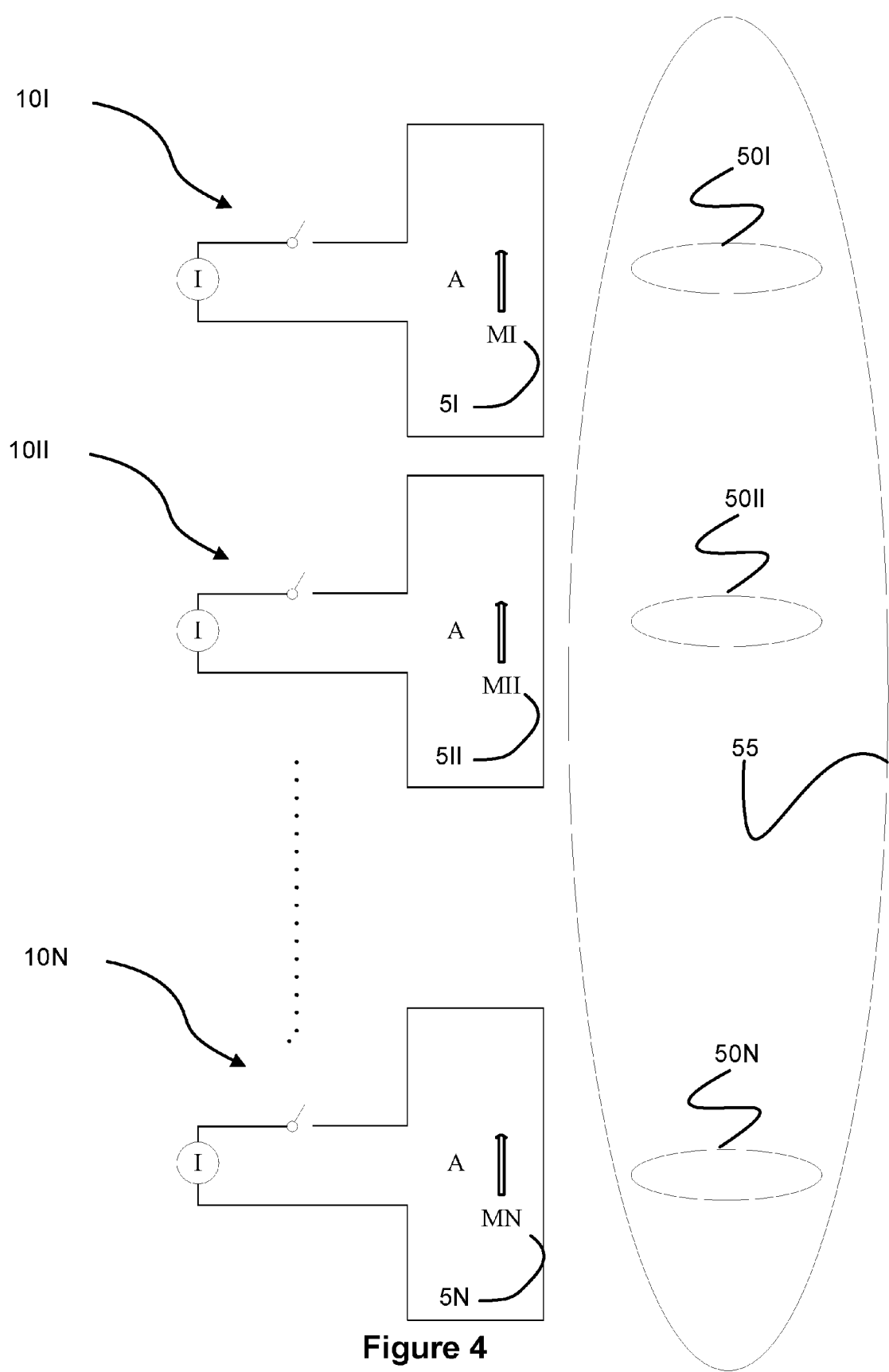
FIG. 4 illustrates N-multiple transmitter arrangements that build a secondary electromagnetic field.

FIG. 4 illustrates N-multiple transmitter arrangements 10I, 10II, . . . 10N building up a total secondary electromagnetic field 55 by contributions from combined secondary electromagnetic fields 50I, 50II, . . . 50N, respectively as induced due to individual magnetic moments 5I, 5II, . . . 5N.

Figure 5:
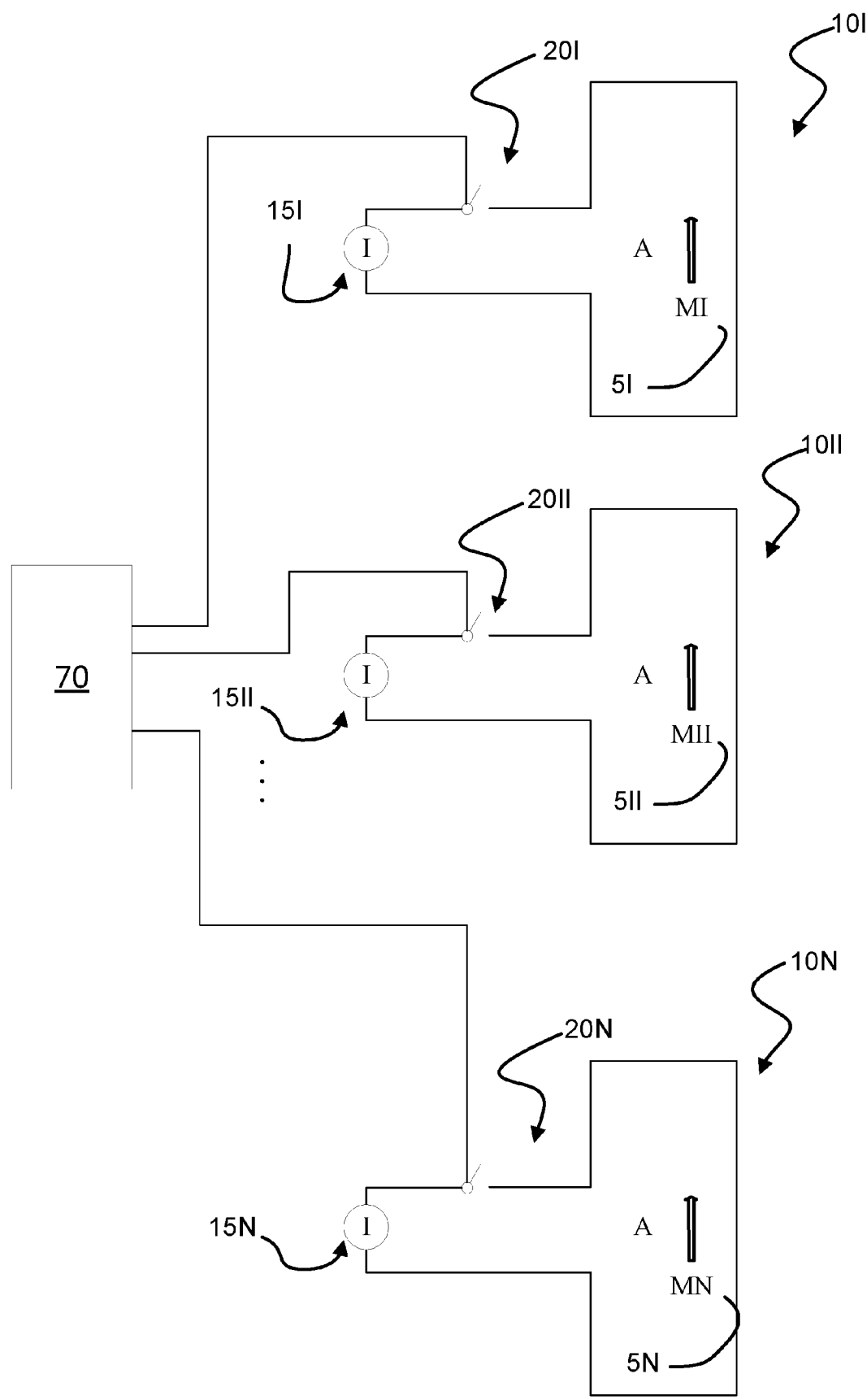
FIG. 5 illustrates a controller arrangement configured to control multiple transmitter arrangements.

FIG. 5 illustrates a switch arrangement controller 70 configured to control switch arrangements 20I, 20II, . . . 20N of multiple transmitter arrangements 10I, 10II, . . . 10N so as to generate magnetic moments 5I, 5II, . . . 5N for inducing a total secondary electromagnetic field. The control to connect and to disconnect may be understood with reference to FIG. 3.

In particular the switch arrangement controller 70 and each switch arrangement 20I, 20II, . . . 20N are configured to control each switch arrangement 20I, 20II, . . . 20N to disconnect 40I, 40II, . . . 40N each current source 15I, 15II, . . . 15N from each transmitter coil arrangement 24I, 24II, . . . 24N at substantially the same time 75 (not shown). With reference to FIG. 3 this is to say that each disconnect 40I, 40II, . . . 40N are essentially simultaneous.

Likewise, the switch arrangement controller 70 and each switch arrangement 20I, 20II, . . . 20N are configured to control each switch arrangement 20I, 20II, . . . 20N to connect 30I, 30II, . . . 30N each current source 15I, 15II, . . . 15N from each transmitter coil arrangement 24I, 24II, . . . 24N at substantially the same time 75 (not shown). With reference to FIG. 3 this is to say that each connect 30I, 30II, . . . 30N are essentially simultaneous.

In an embodiment where transmitter coils and transmitter arguments are identical, the controller may be arranged to provide switching signals, and switching arrangements may be configured to switch individual switches to within 50 us, preferably within 10 us or more preferably to within 1 us. As such it is understood that simultaneously or 'at the same time' may be within a period of less than those times.

Figure 6:
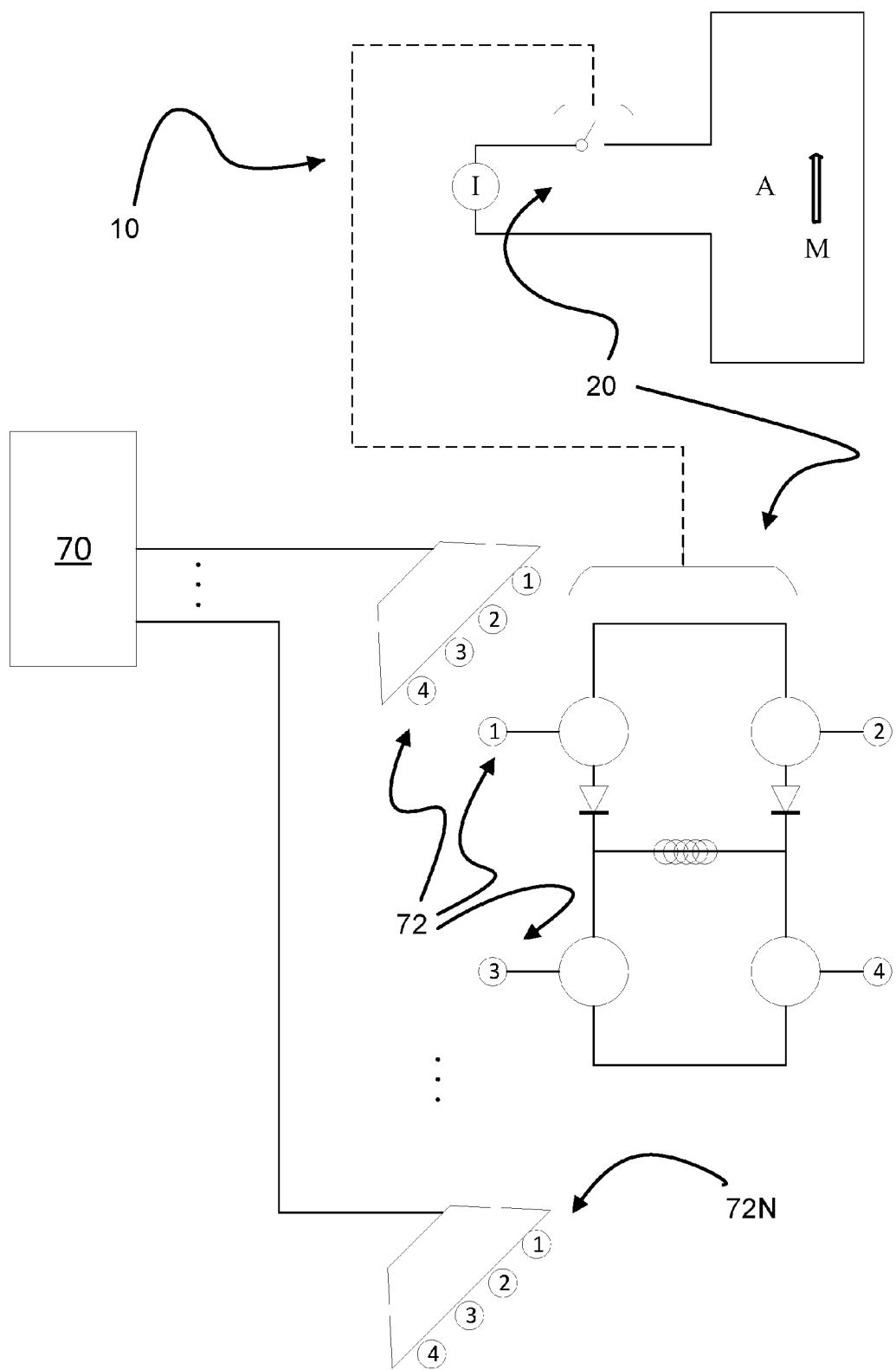
FIG. 6 illustrates a controller arrangement configured to control switch controls in a switch arrangement of a transmitter arrangement.

FIG. 6 illustrates a switch controller arrangement 70 configured to control switch controls 72 in a switch arrangement 20 of a transmitter arrangement 10. In this particular embodiment there is a switch arrangement 20 with four individual switches (1), (2), (3) and (4), which individual switches are controlled by corresponding switch controller arrangements 70 control lines (1), (2), (3) and (4). In an embodiment with identical switch arrangements 20I, . . . 20N, the control logic of the controller is to control individual switches (1), (2), (3) and (4) simultaneously. Possibly with adjustments to compensate for delays in different switch arrangements 30.

Figure 7:
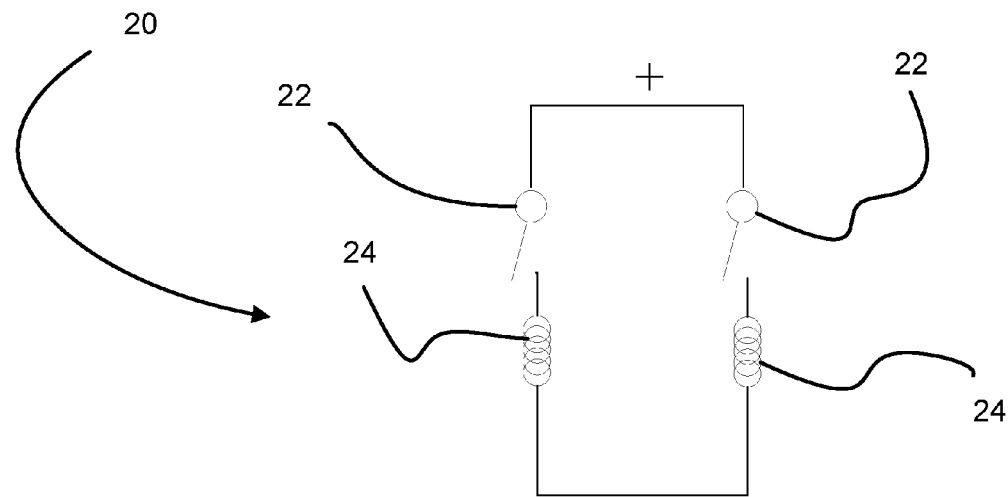
FIG. 7 illustrates switch arrangements; including a bridge arrangement.
Figure 7:
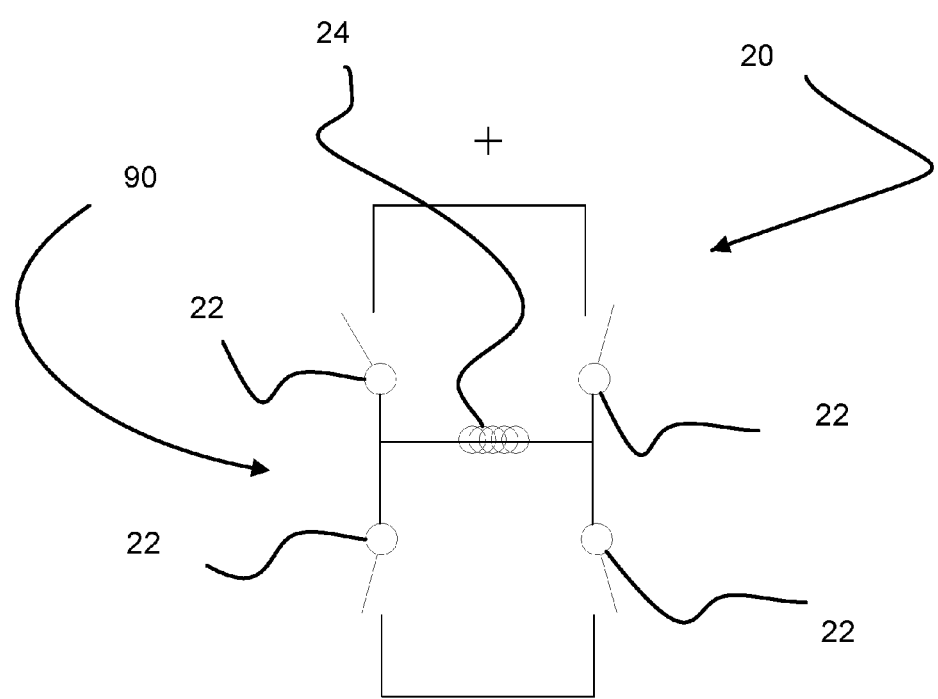

FIG. 7 illustrates switch arrangements 20. The top figure shows a switch arrangement 20 with a switch 22 controlling a transmitter coil arrangement 24. The bottom figure illustrates a bridge arrangement 90 with four individual switches 22 configured to connect 30 and disconnect 40 the transmitter coil arrangement 24.

Figure 8:
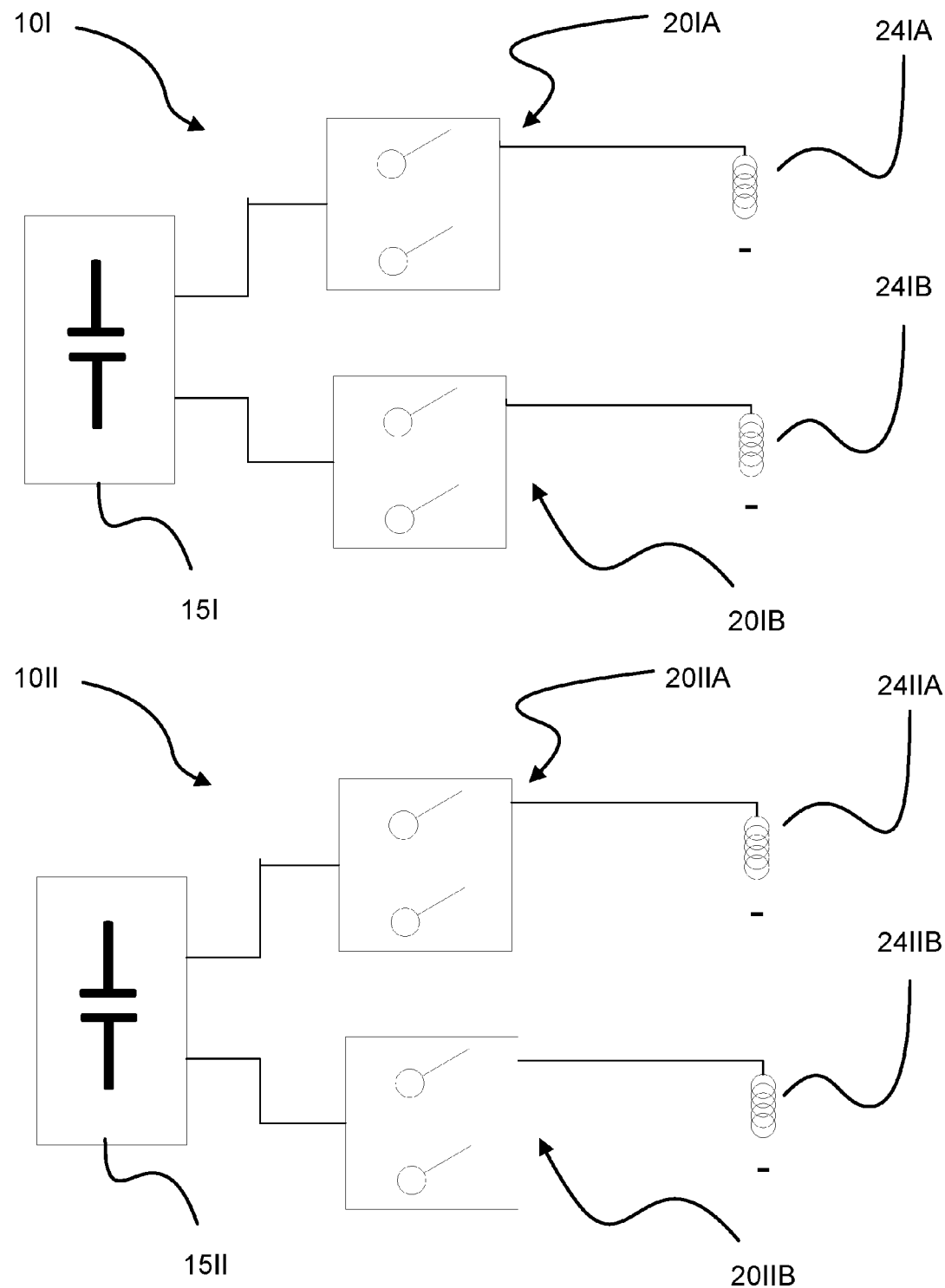
FIG. 8 illustrates multiple transmitter arrangements, each with a single current source and a pair of switch arrangements and transmitter coils.

FIG. 8 illustrates multiple transmitter arrangement 10I, 10II, each with a single current source 15I, 15II, respectively, and each a pair of switch arrangement 20IA, 20IB and 20IIA, 20IIB and transmitter coil arrangements 24IA, 24IB and 24IIA, 24IIB, respectively.

In this embodiment identical switch arrangements 20 are used and switches configured to operate to connect transmitter coils 24IA, 24IB to the current source 15I at the same time as to connect transmitter coils 24IIA, 24IIB to the current source 15II. Similarly, the switch arrangements are configured to disconnect at the same time, but later time than the connect time.

Furthermore, the figure illustrates the embodiment, where the transmitter coils 24IA, 24IB, 24IIA, 24IIB are aligned on top of each other to form essentially a coil structure spanning essentially the same space.

Figure 9:
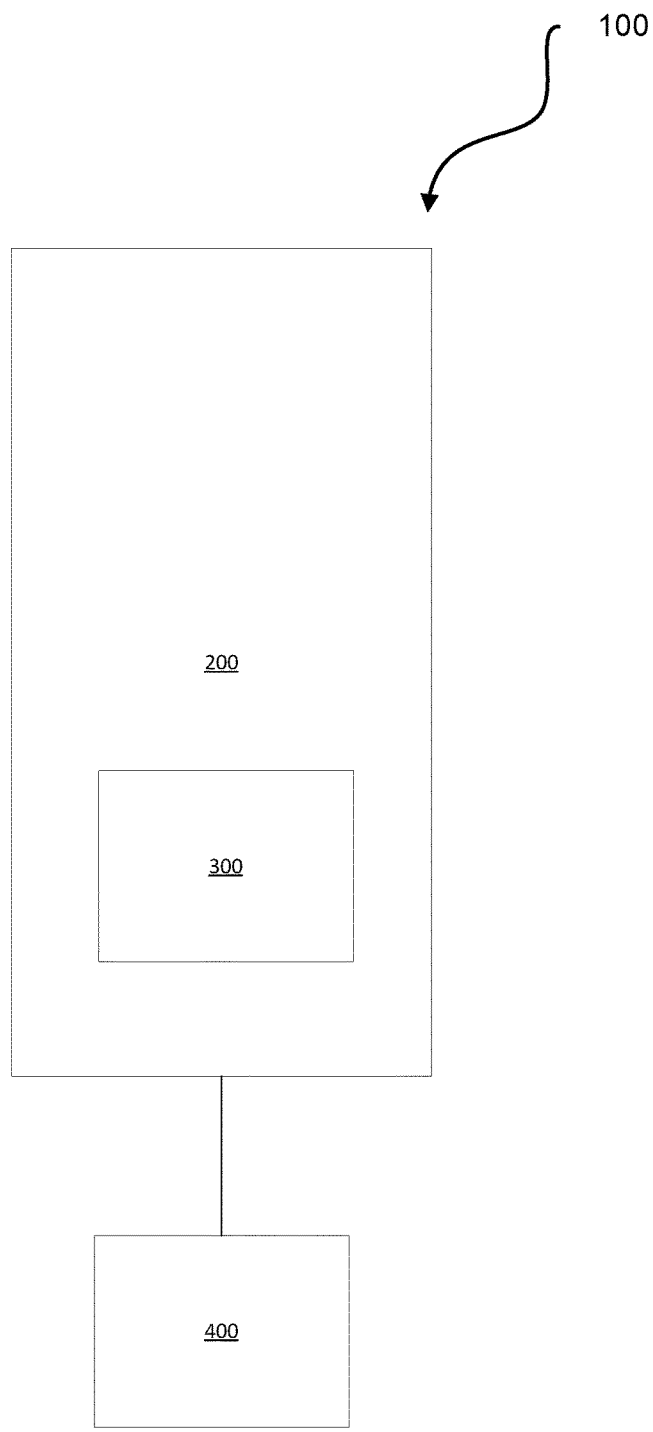
FIG. 9 illustrates a method of geophysical prospecting using multiple transmitter arrangements.

FIG. 9 illustrates a method of geophysical prospecting 100 using multiple transmitter arrangements 10 (not shown).

The method 100 comprises steps of generating 200 a total secondary electromagnetic field.

The total secondary electromagnetic field 55 may compromise, with reference to previous figures, a sum of individual combined secondary electromagnetic fields 50 using multiple transmitter arrangements $T_x$ 10 which transmitter arrangement $T_x$ 10 comprises at least one current source 15 connected to at least one transmitter coil arrangement 24 covering an area A for generating a magnetic moment 5 for building up a primary electromagnetic field 11 inducing a secondary electromagnetic field 12 in the underground formation 3.

This may be achieved by switching 300, again with references to previous figures, a switch arrangement 20 comprising at least one switch 22 inserted in between the at least one current source 15 and the at least one transmitter coil arrangement 24 and configured to connect 30 the at last one current source 15 with the at least one transmitter coil arrangement 24 to build up a connecting secondary electromagnetic field 38, which connect 30 is at a connection time 32 at a connection voltage 34 at a connection current 36; and to disconnect 40 the at least one current source 15 from the at least one transmitter coil arrangement 24 to build up a disconnecting secondary electromagnetic field 48; which disconnect 40 is at a disconnection time 42 at a disconnection voltage 44 at a disconnection current 46.

The method 100 also encompasses receiving 400 a combined connecting and disconnecting secondary electromagnetic field 50 using a receiver arrangement $R_x$ 60 comprising at least one receiver coil 62 configured to receive the combined connecting and disconnecting secondary electromagnetic fields 50.

Although particular embodiments have been shown and described, it will be understood that they are not intended to limit the present inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents, which may be included within the spirit and scope of the inventions as defined by the claims.

The invention claimed is:

1. An airborne electromagnetic time domain survey system configured for geophysical prospecting of an underground formation, which airborne electromagnetic survey system comprises:
  a transmitter arrangement comprising:
    at least one current source connected to at least one transmitter coil arrangement covering an area for generating a magnetic moment for building up a primary electromagnetic field inducing a secondary electromagnetic field in the underground formation; and
    a switch arrangement comprising at least one switch inserted in between the at least one current source and the at least one transmitter coil arrangement and configured:
      to connect the at least one current source with the at least one transmitter coil arrangement to build up a connecting secondary electromagnetic field, which connect is at a connection time at a connection voltage at a connection current; and
      to disconnect the at least one current source from the at least one transmitter coil arrangement to build up a disconnecting secondary electromagnetic field; which disconnect is at a disconnection time at a disconnection voltage at a disconnection current resulting in an off-time-period until a next connect; which
    connecting secondary electromagnetic field and disconnecting secondary electromagnetic field provide a combined secondary electromagnetic field;
  a receiver arrangement comprising at least one receiver coil configured to receive a combination of the connecting and disconnecting secondary electromagnetic fields;
  wherein the airborne electromagnetic time domain survey system comprises multiple transmitter arrangements that includes the transmitter arrangement, and wherein the airborne electromagnetic time domain survey system also comprises a switch arrangement controller configured to control switch arrangements of the transmitter arrangements to disconnect each current source from each transmitter coil arrangement at substantially the same time generating individual secondary electromagnetic fields whose sum generates a total secondary electromagnetic field.

2. The airborne electromagnetic time domain survey system according to claim 1, wherein at least two of the transmitter coil arrangements are coupled by being placed on top of each other.

3. The airborne electromagnetic time domain survey system according to claim 1, wherein the switch arrangement controller is configured to record the disconnection time of the disconnect by each of the switch arrangements.

4. The airborne electromagnetic time domain survey system according to claim 1, wherein the switch arrangement controller is configured to control the switch arrangements to connect each current source to each transmitter coil arrangement at substantially the same time.

5. The airborne electromagnetic time domain survey system according to claim 1, wherein the individual combined secondary electromagnetic fields are substantially identical to one another.

6. The airborne electromagnetic time domain survey system according to claim 4, wherein the switch arrangement controller is configured to record the connection time of the connect by each of the switch arrangements.

7. The airborne electromagnetic time domain survey system according to claim 1, wherein the at least one current source comprises only a single current source.

8. The airborne electromagnetic time domain survey system according to claim 1, wherein the at least one current source comprises a capacitor, a super capacitor, a mechanical storage, a flywheel, or a battery; or a bank of such.

9. The airborne electromagnetic time domain survey system according to claim 1, wherein the at least one current source comprises a motor generator or a fuel cell.

10. The airborne electromagnetic time domain survey system according to claim 1, wherein the switch arrangement comprises at least two switches.

11. The airborne electromagnetic time domain survey system according to claim 1, wherein the switch arrangement comprises four switches.

12. The airborne electromagnetic time domain survey system according to claim 1, wherein the switch arrangement is arranged with switches in a bridge configuration.

13. The airborne electromagnetic time domain survey system according to claim 1, wherein the at least one switch is a semiconductor type switch.

14. A method of geophysical prospecting comprising use of an airborne time domain electromagnetic survey system configured for geophysical prospecting of an underground formation, the method of geophysical prospecting comprising:
  generating a total secondary electromagnetic field comprising a sum of individual combined secondary electromagnetic fields using multiple transmitter arrangements, each of the transmitter arrangements comprises:
    at least one current source connected to at least one transmitter coil arrangement covering an area for generating a magnetic moment for building up a primary electromagnetic field inducing a secondary electromagnetic field in the underground formation by:
  switching a switch arrangement comprising at least one switch inserted in between the at least one current source and the at least one transmitter coil arrangement, the switching arrangement configured:
    to connect the at least one current source with the at least one transmitter coil arrangement to build up a connecting secondary electromagnetic field, which connect is at a connection time at a connection voltage at a connection current; and
    to disconnect the at least one current source from the at least one transmitter coil arrangement to build up a disconnecting secondary electromagnetic field, which disconnect is at a disconnection time at a disconnection voltage at a disconnection current resulting in an off-time-period until a next connect;
  receiving during the off-time-period a combination of the connecting secondary electromagnetic field and the disconnecting secondary electromagnetic field using a receiver arrangement comprising at least one receiver coil configured to receive the combination of the connecting and disconnecting secondary electromagnetic fields; and
  wherein the act of switching comprises disconnecting the at least one current source from the at least one transmitter coil arrangement to build up the disconnecting secondary electromagnetic field, which disconnecting is at the disconnection time at the disconnection voltage at the disconnection current, and wherein the current sources are disconnected from the transmitter coil arrangements at substantially the same time.

15. The method of geophysical prospecting according to claim 14, wherein the act of switching comprises:
connecting the at least one current source to the at least one transmitter coil arrangement to build up the connecting secondary electromagnetic field, which connecting is at the connection time at the connection voltage at the connection current, wherein the current sources are connected to the transmitter coil arrangements at substantially the same time.

16. The method of geophysical prospecting according to claim 14, wherein at least two of transmitter coil arrangements are coupled by being placed on top of each other.

* * * * *